United States Patent
Agapescu

(10) Patent No.: US 9,671,676 B2
(45) Date of Patent: Jun. 6, 2017

(54) BI-STABLE ELECTROMAGNETICALLY CONTROLLED SHUTTER

(71) Applicant: Thorlabs, Inc., Newton, NJ (US)

(72) Inventor: Tudor Agapescu, Ringwood, NJ (US)

(73) Assignee: Thorlabs, Inc., Newton, NJ (US)

( * ) Notice: Subject to any disclaimer, the term of this patent is extended or adjusted under 35 U.S.C. 154(b) by 289 days.

(21) Appl. No.: 14/090,578

(22) Filed: Nov. 26, 2013

(65) Prior Publication Data

US 2014/0146378 A1    May 29, 2014

Related U.S. Application Data

(60) Provisional application No. 61/730,048, filed on Nov. 26, 2012.

(51) Int. Cl.
| | | |
|---|---|---|
| *G02B 9/22* | (2006.01) | |
| *G03B 9/22* | (2006.01) | |
| *G03B 9/62* | (2006.01) | |

(52) U.S. Cl.
CPC ........ *G03B 9/22* (2013.01); *G03B 9/62* (2013.01)

(58) Field of Classification Search
CPC ........ G02B 26/02; G02B 5/005; G02B 26/04; G02B 21/0044; G03B 9/62; G03B 9/22; G03B 9/06
USPC ........................................................ 359/234
See application file for complete search history.

(56) References Cited

U.S. PATENT DOCUMENTS

| | | | | |
|---|---|---|---|---|
| 5,266,913 | A | * | 11/1993 | Chapman ........... G01R 33/4215 324/307 |
| 2004/0085061 | A1 | | 5/2004 | Busch et al. |
| 2010/0189431 | A1 | * | 7/2010 | Viglione ................. G03B 9/22 396/463 |
| 2010/0189432 | A1 | | 7/2010 | Viglione et al. |
| 2011/0242636 | A1 | | 10/2011 | Viglione |

FOREIGN PATENT DOCUMENTS

| | | |
|---|---|---|
| DE | 29618137 U1 | 3/1998 |
| EP | 1958054 B1 | 3/2010 |
| KR | 2011047459 A | 5/2011 |
| SU | 916976 A1 | 3/1982 |

OTHER PUBLICATIONS

International Search Report mailed Mar. 27, 2014 in corresponding International Patent Application No. PCT/US2013/071968.
Extended European search report including the European search opinion issued for corresponding European Patent Application No. 13857366.2 dated Jun. 16, 2016.

* cited by examiner

*Primary Examiner* — Jennifer L. Doak
(74) *Attorney, Agent, or Firm* — Graham Curtin, P.A.

(57) ABSTRACT

A shutter assembly comprises a plurality of shutter blades movable between an open position and a closed position, and a plurality of drive mechanisms arranged circumferentially about the plurality of shutter blades for moving the plurality of shutter blades, wherein each of said drive mechanisms is stable in at least a first position and a second position.

17 Claims, 6 Drawing Sheets

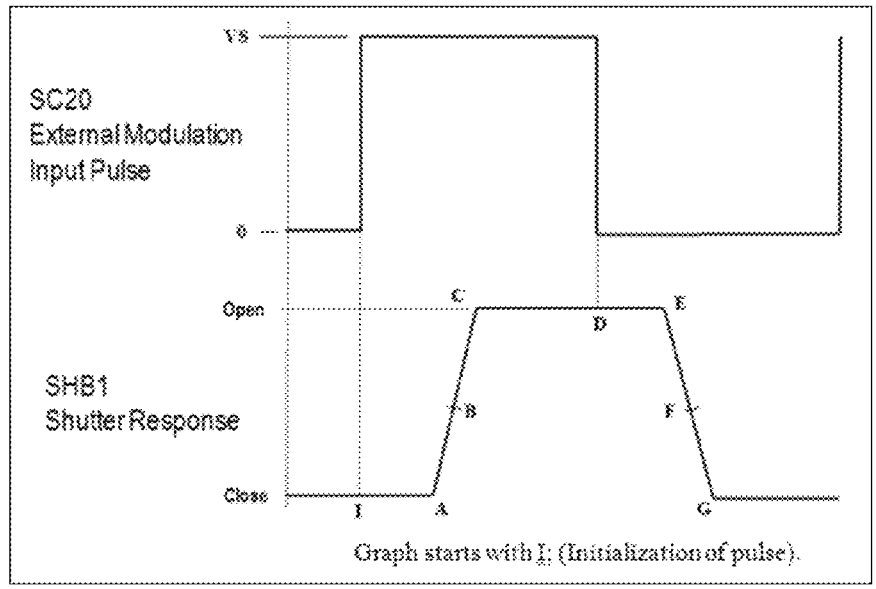

FIG. 6

- Coil resistance measures 8.5 ohms.
- There are a total of 4 coils; 2 to Open and 2 to Close.
- The 2 coils for Open are in series and the 2 coils for Close are in series.
- The Open and Close coils are then connected in parallel.

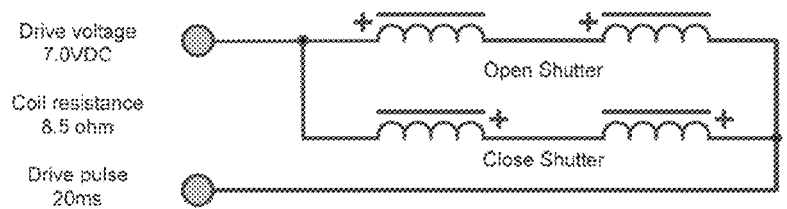

- The drive voltage is 7.0VDC. On startup there is a 20ms turn on pulse to energize the solenoid.
- After the 7VDC / 20ms pulse a PWM is generated at 20 kHz with a 20% duty cycle. This sets the voltage at about 1.4 VDC. The 20% hold voltage is used to remove any bounce upon open and close of the shutter blades.
- With the resistance of the coil at 8.5 ohms and 20% DC of 7.0VDC the rated power = $E^2/R$, where: 1.4 $VDC^2/4.5$ ohms = 0.231 watts.
- If the coil does not change state after three minutes, the drive at 20% DC is removed to eliminate any power usage.

FIG. 7

BI-STABLE ELECTROMAGNETICALLY CONTROLLED SHUTTER

CROSS-REFERENCE TO RELATED APPLICATIONS

This application claims the benefit of U.S. provisional patent application No. 61/730,048, filed Nov. 26, 2012, the contents of which are incorporated herein by reference.

FIELD OF THE INVENTION

The present invention relates to shutter assemblies generally, and more specifically to bi-stable electromagnetically controlled shutter assembly for use with photographic, scientific, or biomedical applications

BACKGROUND

Shutter assemblies are used in many applications in which a shutter open/close cycle is required. Traditional assemblies often work in different ways, some providing force in only one direction and relying on a spring return for the second portion of a cycle. The use of a spring return solenoid as a driver, for example, offers poor control over the open/close times due to different driving forces involved—electromagnetic and spring forces.

Other cycles rely on bulky mechanisms where space is at a premium or complicated mechanisms where simplicity is an asset. There is always a need for a smaller and thinner shutter that can more easily fit into a beam path for opto-mechanical applications for example, as well as a simpler and more reliable shutter assembly that can operate at high speeds with reduced jitter and bouncing of shutter blades.

SUMMARY

One embodiment of a shutter assembly comprises a plurality of shutter blades movable between an open position and a closed position, and a plurality of drive mechanisms arranged circumferentially about the plurality of shutter blades for moving the plurality of shutter blades, wherein each of said drive mechanisms is stable in at least a first position and a second position. In a preferred embodiment, each drive mechanism further comprises a solenoid and a permanent magnet armature, and the drive mechanisms are positioned in a pattern that creates a balanced open/close driving force resulting in close values for the rise and fall times. The pattern is designed to have two solenoids acting in tandem for opening/closing action providing a constant force for the entire actuation of the shutter assembly.

BRIEF DESCRIPTION OF THE DRAWINGS

FIG. 6 shows one embodiment of timing data for the shutter of FIG. 1.

FIG. 7 shows one embodiment of an arrangement of drive mechanisms.

DETAILED DESCRIPTION OF THE PREFERRED EMBODIMENTS

Figure 1:
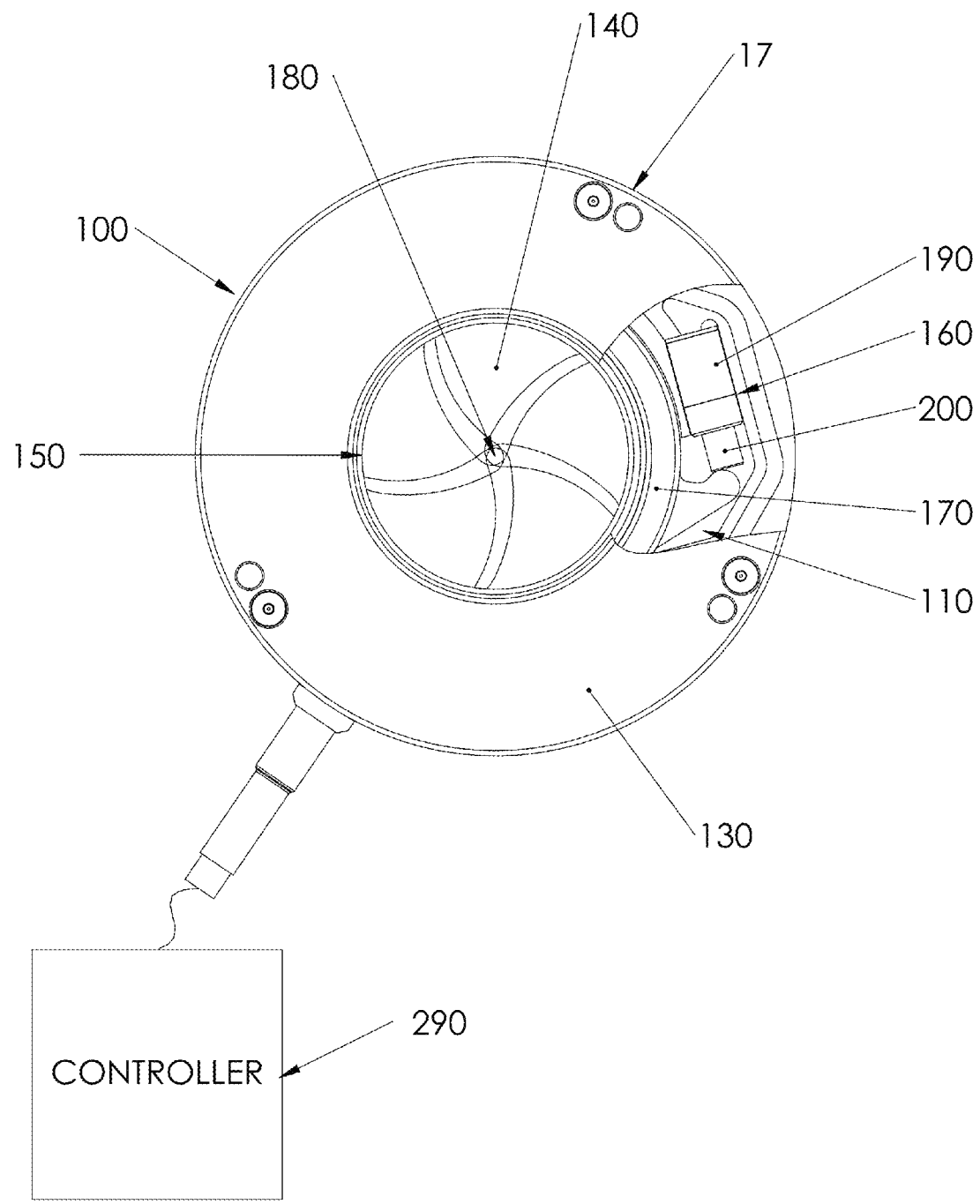
FIG. 1 shows a front view of one embodiment of a shutter in accordance with the current disclosure with certain portions partially removed.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

Figure 2:
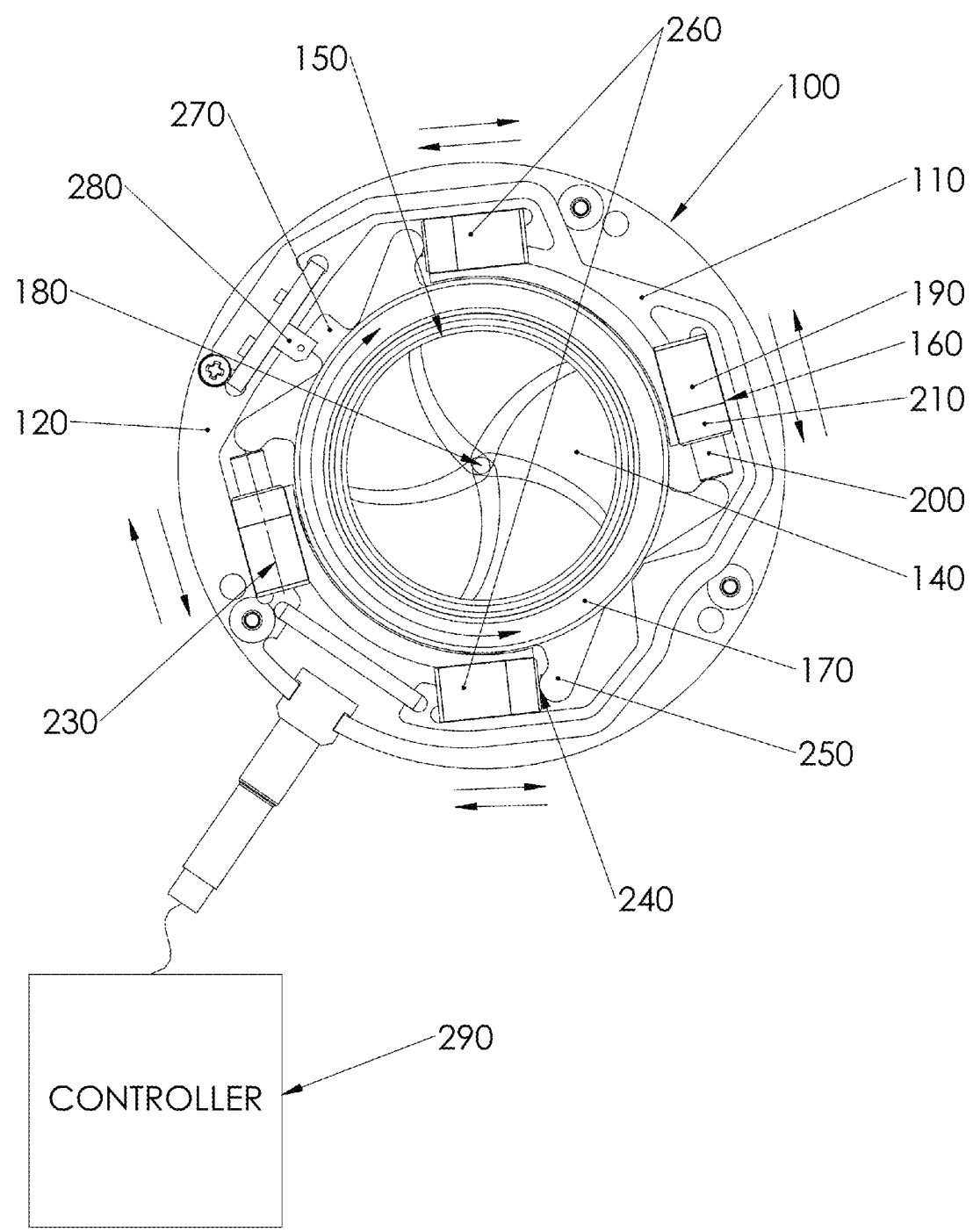
FIG. 2 shows a front view of the shutter embodiment of FIG. 1 with certain portions entirely removed.
Figure 4:
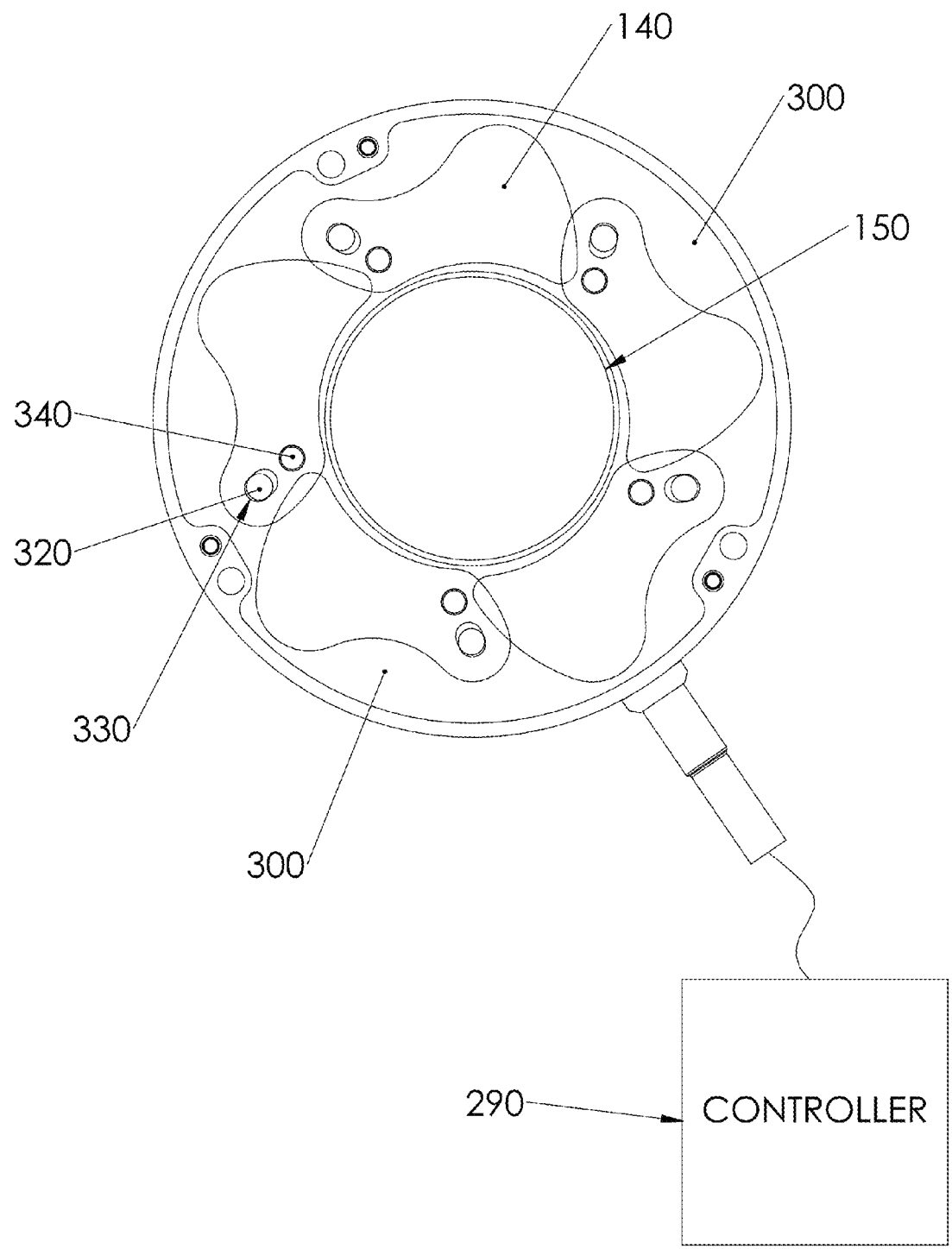
FIG. 4 shows a back view of the shutter embodiment of FIG. 1 with certain portions entirely removed and the shutter blades arranged in an open position.

FIGS. 1-2 show one embodiment of a front view of a shutter assembly 100 comprising a driving assembly pocket 110 that contains parts for driving the shutter assembly 100, the driving assembly pocket 110 defined between a base plate 120 and a front cover 130. Base plate 120 supports components of a driving assembly on one side and a plurality of shutter blades 140 on the other side, the shutter blades 140 being movable between a closed position as shown in FIGS. 1-2, and an open position as shown in FIG. 4, the open position exposing a light passage opening 150. A plurality of drive mechanisms 160 disposed in the driving assembly pocket 110 move shutter blades 140 from the closed position (FIGS. 1-2), wherein the shutter opening 150 is blocked or occluded, to the open position (FIG. 4) exposing the shutter opening 150. FIG. 1 illustrates a portion of the front cover 130 removed for purposes of illustrating the drive mechanism 160, while FIG. 2 illustrates the entirety of the front cover 130 removed to better show the components of the driving assembly pocket 110.

Shutter opening 150 is surrounded by a drive ring 170 that is driven by drive mechanisms 160 to move shutter blades 140 between open and closed positions. Drive ring 170 rotates about an axis 180 perpendicular to shutter blades 140 when force is applied to the drive ring 170 by drive mechanisms 160. Axis 180 also defines a central axis of the shutter assembly 100. Drive ring 170, when rotated in a first direction, moves shutter blades 140 from a closed position to an open position, and when rotated in a second direction moves shutter blades 140 from an open position to a closed position.

In the illustrated embodiment, each drive mechanism 160 further comprises a solenoid 190 with a permanent magnet armature 200. However, it will be understood that other drive mechanism constructions are possible, such as mechanisms that don't use a solenoid or a permanent magnet armature. In the illustrated embodiments, however, drive mechanisms 160 are preferably linear, such as solenoids or voice coils Each drive mechanism 160 is stable in at least two positions. In the illustrated embodiment, each drive mechanism 160 is a solenoid 190 with a solenoid frame 210 with coils (not shown) wound on a portion of the frame 210. Each solenoid 190 further comprises an axis 230 along which permanent magnet 200 travels linearly. Solenoid 190 has a magnetic field generated by current flow through coils (not shown) which moves permanent magnet 200 along axis 230 between a first stable position where permanent magnet 200 is substantially encased within solenoid frame 210, and a second stable position wherein permanent magnet 200 is extended relative to the solenoid frame 210. Reversing the current flow through coils causes permanent magnet 200 to be moved from the first stable position to the second stable position and vice versa. Permanent magnet 200 is initially set with an offset so that a magnetic field misalignment is generated, allowing for linear movement between the stable positions.

In the illustrated embodiment shown in particular in FIGS. 1-2, four drive mechanisms 160 are shown. Each drive mechanism 160 has a contact 240 with drive ring 170 on a drive ring arm 250, and can apply linear force at the contact point to rotate drive ring 170. Drive mechanisms 160 act in pairs 260 with each pair 260, having a first drive mechanism to rotate drive ring 170 in the first direction, and having a second drive mechanism to rotate drive ring 170 in the second direction when each individual permanent magnet 200 moves from the first stable position to the second stable position. It will be appreciated that while the illustrated embodiment shows armature 200 resting on contact 240, permanent magnet 200 may be connected to contact 240 by a linkage (not shown), allowing drive mechanism 160 to apply force in both directions. In one embodiment illustrated in FIG. 7, the drive mechanisms 160 of each pair of drive mechanisms are connected in series and the pairs of drive mechanisms are connected in parallel.

The four drive mechanisms 160 are preferably arranged in two pairs 260 (FIG. 2), with each pair having one drive mechanism pushing clockwise along the circumference of drive ring 170 and a second drive mechanism pushing counterclockwise along the circumference of drive ring 170.

As shown in the embodiment of FIG. 2, the two pairs 260 are positioned diagonally and work in tandem to push/drive the drive ring 170. Drive ring 170 further includes a tab 270 for use with a sensor 280 for sensing the location of drive ring 170. In the illustrated embodiment, sensor 280 is an optointerrupter, but it will be understood that the sensor may be a proximity sensor among other sensor types. Sensor 280 may provide information regarding shutter position in implementing an interlock system and in preventing shutter assembly 100 from jamming.

The action of drive mechanisms 160, such as the movement from one stable position to the other, is controlled by a controller 290. The controller 290 typically initiates a two stage cycle for shutter assembly 100 having an opening motion and a closing motion. In the opening motion, controller 290 sends a signal causing at least one drive mechanism 160 to move from the first stable position to the second stable position. The movement of drive mechanism 160 causes drive ring 170 to rotate in the first direction about axis 180, which in turn causes shutter blades 140 to move to an open position as shown in FIG. 4. In the closing motion of shutter assembly 100, the controller 290 sends a signal causing drive mechanism 160 to return to the first stable position while simultaneously causing at least one other drive mechanism to move from the first stable position to the second stable position. The movement of drive mechanisms 160 in the second portion of the cycle causes drive ring 170 to rotate in the second direction about axis 180, which in turn causes shutter blades 140 to move from the open position to the closed position. In some embodiments, controller 290 is provided with information related to the current location of shutter blades 140 from sensor 280.

Figure 3:
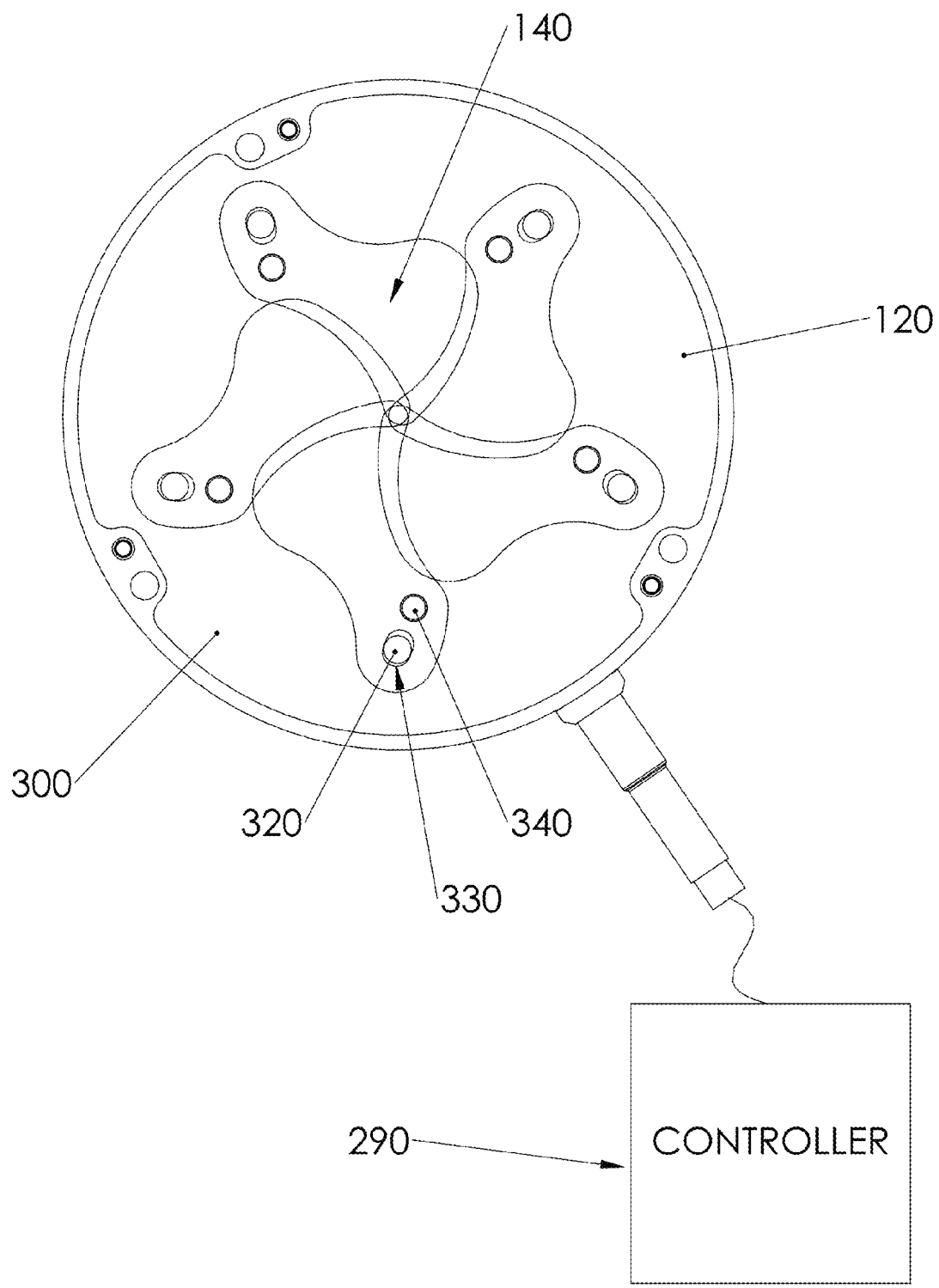
FIG. 3 shows a back view of the shutter embodiment of FIG. 1 with certain portions entirely removed and the shutter blades arranged in a closed position.
Figure 5:
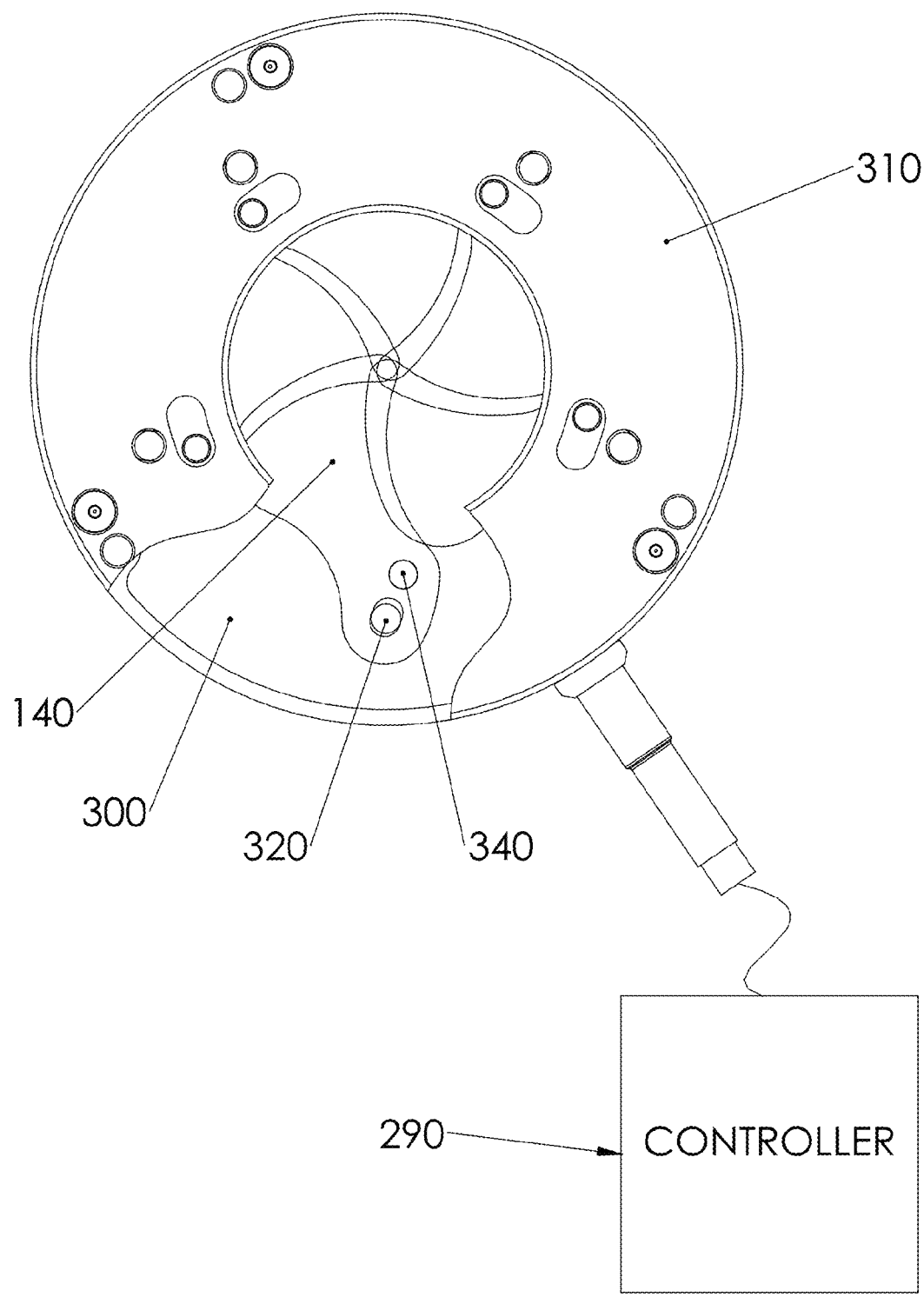
FIG. 5 shows a back view of the shutter embodiment of FIG. 1 with certain portions partially removed.

FIGS. 3 and 5 shows a back view of the shutter assembly 100 of FIG. 1 with portions of a back cover 310 shown in FIG. 5 entirely removed in FIG. 3, and with shutter blades 140 shown in a closed position. Shutter blades 140 are supported by base plate 120 (FIGS. 1-2) within a shutter blade pocket 300. Shutter blade pocket 300 is the space between base plate 120 and a back cover 310 for the unit. Driving assembly pocket 110 and shutter blade pocket 300 comprise the interior space of shutter assembly 100.

In the illustrated embodiment, each shutter blade 140 is connected to base plate 120 by a pin 320 fixed between base plate 120 and back cover 310. While a pin-based construction is shown, it will be appreciated that other connective structures are possible. Each shutter blade 140 pivots about pin 320 by means of a slotted hole 330 in shutter blade 140. Each shutter blade 140 is further connected to other components of shutter assembly 100 at a drive ring pin 340, offset from pin 320 and connected to drive ring 170. The rotation of drive ring 170 about axis 180 relative to base plate 120 moves drive ring pin 340 relative to pin 320. The slotted nature of the connection of shutter blade 140 to pin 320 allows for a small amount of linear motion combined with rotational motion at both pins to move shutter blade 140 between the open and closed positions.

FIG. 4 shows a back view of shutter assembly 100 of FIG. 1 with the back cover (see FIGS. 3 and 5) removed and the shutter blades 140 in an open position. The components shown are similar to those shown in FIG. 3, except that drive ring pin 340 is shown in a different position relative to pin 320, and the relative orientation of the two pins causes shutter blades 140 to be maintained in an open position, revealing shutter opening 150.

FIG. 6 illustrates one example of timing data associated with a shutter assembly 100 identified by "SHB1" that is driven by a shutter controller identified by "SC20", where the shutter assembly is driven by an initial pulse ("I") from a closed position ("A" and "G") to an open position "C" through "E").

| Interval recorded | Interval in FIG. 6 | Timing Interval (ms) |
|---|---|---|
| Delay between pulse initiation and shutter opening initiation | I-A | 13.0 |
| Rising edge to 100% open | A-C | 10.0 |
| Falling edge to 100% closed | E-G | 10.0 |
| Delay between pulse and fully open | I-C | 22.2 |
| Delay from fall of input pulse to initiation of shutter closing | D-E | 14.0 |
| Minimum drive pulse (MDP) to drive minimum open time | I-D | 25.0 |
| Minimum exposure pulse using MDP | C-E | 17.0 |
| Minimum exposure pulse using MDP with measurements at 50% open and closed | B-F | 27.0 |
| Minimum exposure pulse using MDP, full cycle time | A-G | 34.0 |

When compared with existing conventional shutters, shutter assembly 100 provides equivalent or faster times for every interval in the shutter open and close cycle leading to substantial reduction in the minimum cycle time for the shutter. In particular, substantial performance increases are seen in the second half of the cycle provided by the mechanical advantage by implementing a symmetric cycle.

In a preferred embodiment, the shutter assembly 100 is capable of continuously operating at a sustained maximum rate of 10 Hz at 50% duty cycle. The performance gains are despite nearly identical delays I-A and D-E (FIG. 6) when compared to conventional shutters. These time intervals are the time it takes to energize coils in solenoid 190. As such, they are a constant characteristic of the hardware used. The net effect of this anomaly is that the delay from the initiation of the starting 20 ms pulse to the shutter fully open state (I-C) is 22.2 ms. These anomalies affect the duty cycle open and close times. For example, if the shutter controller 290 is fed a square wave with a 50% duty cycle; 100 ms open and 100 ms close time, the result would be a 102 ms exposure and a 102 ms closure on the shutter assembly 100. Beyond timing advantages of the design, the shutter assembly 100 also maintains its performance at higher frequencies without being subject to increasing jitters.

In a preferred embodiment, the shutter assembly 100 comprises a one inch opening 150 with five shutter blades 140 for quick opening and closing times. Of course, other opening dimensions are possible, and fewer or more blades 140 may be used as desired. The shutter assembly 100 is preferably connected to the controller 290 through a hard-wired four conductor shielded cable. In a preferred embodiment, the shutter assembly benefits from a thin design to easily fit into a beam path of an optomechanical assembly. A sensor may be included to detect shutter position, in the event of a jammed shutter. Additional inputs may be provided to allow a user to switch the shutter by modulating the frequency with a TTL level square wave. In one embodiment, optical feedback from shutter assembly 100 and from sensor 280 will allow monitoring of shutter position. In the event of a shutter failure, in one embodiment, the driver will shut down enabling a fault LED (light emitting diode) and Interlock.

In one embodiment, in a normal operation condition where the shutter is used with a laser assembly, a relay will be energized, a contact will be closed, and the state of the laser will be on. In the event of shutter failure, the relay will be de-energized where the NO (normally open) contacts will be open, and the state of the laser will be off. In one embodiment, a power button (not shown) and an enable button (not shown) allow a user to power up and control the shutter using external modulation to set the drive frequency. The enable button, when pressed, will override the external input allowing manual control of the shutter.

The shutter assembly of the present disclosure is ideal for various photonic applications including fluorescence microscopy, laser safety, imaging, low power lasers, visible, ultraviolet, and infrared spectral.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A shutter assembly, comprising:
a plurality of shutter blades movable between an open position and a closed position;
a plurality of drive mechanisms arranged circumferentially about the plurality of shutter blades for moving the plurality of shutter blades;
wherein each of said drive mechanisms is stable in at least a first position and a second position;
wherein each drive mechanism is a linear drive mechanism that comprises:
a solenoid with a solenoid frame with coils wound on a portion of the frame, the solenoid having a first axis about which the coils are azimuthally wound; and
a permanent magnet armature movable linearly within the solenoid frame along the first axis;
wherein the first position of the drive mechanism has the permanent magnet armature substantially encased within the solenoid frame and the second position of the drive mechanism has the permanent magnet armature extended relative to the solenoid frame.

2. The shutter assembly of claim 1, wherein the drive mechanisms are in pairs and wherein a first drive mechanism moves from the first position to the second position while a second drive mechanism moves from the second position to the first position.

3. The shutter assembly of claim 2, further comprising a drive ring for moving the shutter blades between the open and closed positions, the drive ring rotatable about a second axis perpendicular to the shutter blades, wherein the drive mechanisms apply force to the drive ring, and wherein the drive ring rotates in a first direction when the first drive mechanism moves from the first position to the second position and the drive ring rotates in a second direction when the second drive mechanism moves from the first position to the second position.

4. The shutter assembly of claim 3, wherein movement from the second position to the first position prevents a drive mechanism from interfering with the rotation of the drive ring.

5. The shutter assembly of claim 3, further comprising two or more pairs of drive mechanisms acting substantially simultaneously in a cycle having a first stage and a second stage, so that the first drive mechanism from each pair applies a force to the drive ring during the first stage, rotating the drive ring in the first direction, and the second drive mechanism from each pair applies a force to the drive ring during the second stage, rotating the drive ring in the second direction.

6. The shutter assembly of claim 5, wherein the drive mechanisms of each pair of drive mechanisms are connected in series and the pairs of drive mechanisms are connected in parallel.

7. The shutter assembly of claim 1, further comprising a drive ring for moving the shutter blades between the open and closed positions, the drive ring rotatable about a second axis perpendicular to the shutter blades and the drive ring having a point for receiving force from the drive mechanism, wherein the drive ring transmits force from the drive mechanisms to the shutter blades.

8. The shutter assembly of claim 7, each shutter blade further comprising a first connection point fixed with respect to a base plate, a point for receiving force from the drive ring offset from the first pivot point, and wherein the drive ring rotating in a first direction moves the plurality of shutter blades from the open positions to the closed positions, and the drive ring rotating in a second direction moves each of the plurality of shutter blades from the closed position to the open position.

9. The shutter assembly of claim 8, wherein the point for receiving force from the drive ring is a second connection point fixed to the drive ring.

10. The shutter assembly of claim 9, wherein the first connection point is a slotted hole in the shutter blade.

11. The shutter assembly of claim 7, further comprising a means for monitoring the position of the drive ring.

12. The shutter assembly of claim 11, wherein the means for monitoring is an optointerrupter.

13. The shutter assembly of claim 11, wherein the means for monitoring is a proximity sensor.

14. A shutter assembly, comprising:
a plurality of shutter blades movable between an open position and a closed position; and
a plurality of drive mechanisms arranged circumferentially about the plurality of shutter blades for moving the plurality of shutter blades;
wherein the plurality of drive mechanisms are arranged in pairs, with each pair having a first drive mechanism facing a first direction and a second drive mechanism facing a second direction;
wherein each drive mechanism is stable in at least a first position and a second position;
wherein each drive mechanism is a linear drive mechanism that comprises:
a solenoid with a solenoid frame with coils wound on a portion of the frame, the solenoid having a first axis about which the coils are azimuthally wound; and
a permanent magnet armature movable linearly within the solenoid frame along the first axis;
wherein the first position of the drive mechanism has the permanent magnet armature substantially encased within the solenoid frame and the second position of the drive mechanism has the permanent magnet armature extended relative to the solenoid frame.

15. The shutter assembly of claim 14, wherein the pairs of drive mechanisms are arranged diagonally.

16. The shutter assembly of claim 15, wherein the pairs of drive mechanisms work in tandem to move the plurality of shutter blades between an open and a closed position.

17. The shutter assembly of claim 16, wherein the pairs of drive mechanisms drive a drive ring that moves the plurality of shutter blades between an open and a closed position.

* * * * *